Dec. 11, 1928.

B. F. BELL, SR 1,695,168

MOUTH GAG AND TONGUE HOLDER

Filed Aug. 16, 1927

Inventor
B. F. Bell Sr.
by Wilkinson & Giusta
Attorneys.

Dec. 11, 1928.
B. F. BELL, SR
1,695,168
MOUTH GAG AND TONGUE HOLDER
Filed Aug. 16, 1927      3 Sheets-Sheet 2
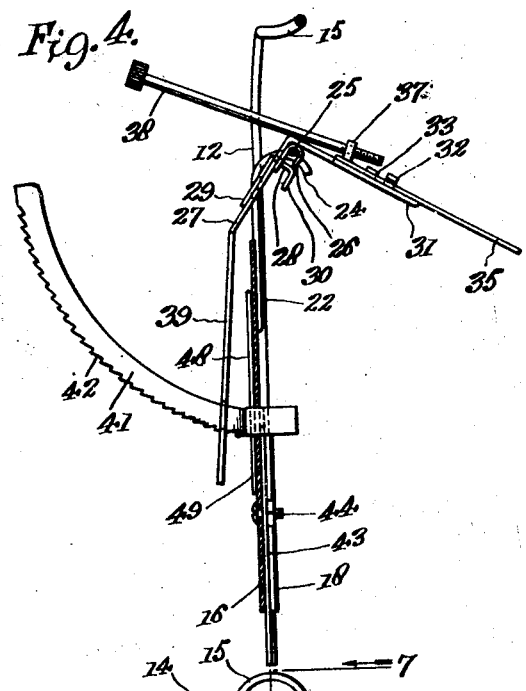
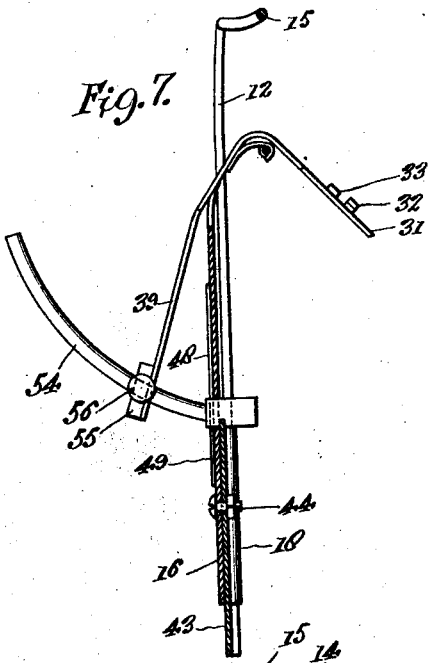
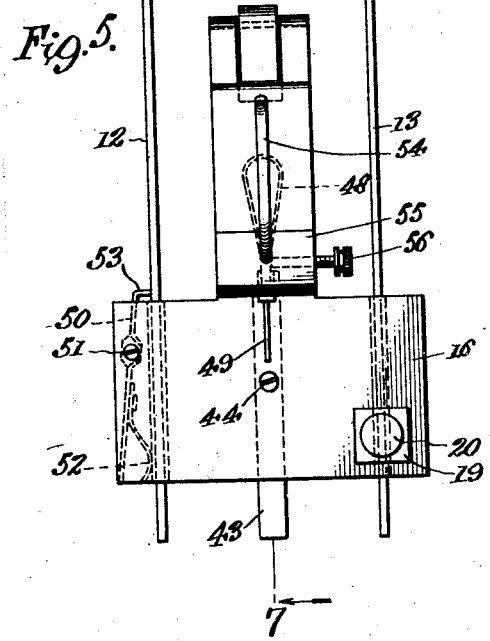
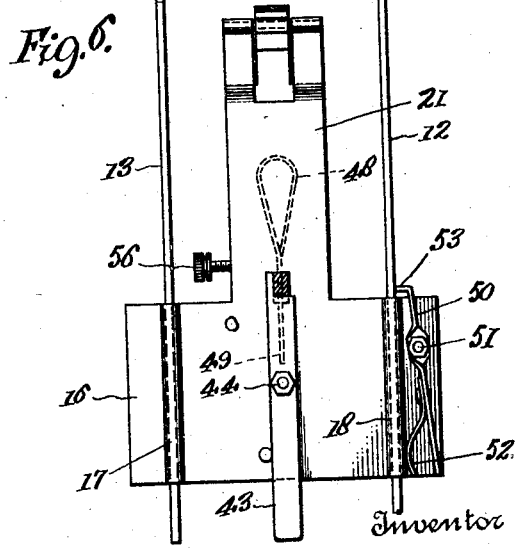
Inventor
B. F. Bell Sr.
by Wilkinson & Giusta
Attorneys.

Dec. 11, 1928.

B. F. BELL, SR 1,695,168

MOUTH GAG AND TONGUE HOLDER

Filed Aug. 16, 1927      3 Sheets-Sheet 3

Inventor
B. F. Bell Sr.
by Wilkinson & Giusta
Attorneys

Patented Dec. 11, 1928.

1,695,168

UNITED STATES PATENT OFFICE.

BENJAMIN FRANKLIN BELL, SR., OF TYLER, TEXAS.

MOUTH GAG AND TONGUE HOLDER.

Application filed August 16, 1927. Serial No. 213,328.

The present invention relates to improvements in mouth gags and tongue holders, and has for an object to provide an effective instrument for holding the mouth open and the tongue down during mouth and throat operations without an assistant, in which the instrument will be adjustable both as to the mouth gag, and the tongue holder.

Other objects of the invention are to produce an instrument of this two-fold character of few parts, simply and inexpensively constructed, and so arranged and coordinated as to be susceptible of easy adjustment.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved mouth gag and tongue holder constructed according to the present invention.

Figure 4 is a vertical section taken on the line 4—4 in Figure 2.

Figure 5 is a front elevation of a modified form of device.

Figure 6 is a rear elevation thereof, with parts shown in section.

Figure 7 is a vertical central section taken on the line 7—7 in Figure 5.

Figure 1:
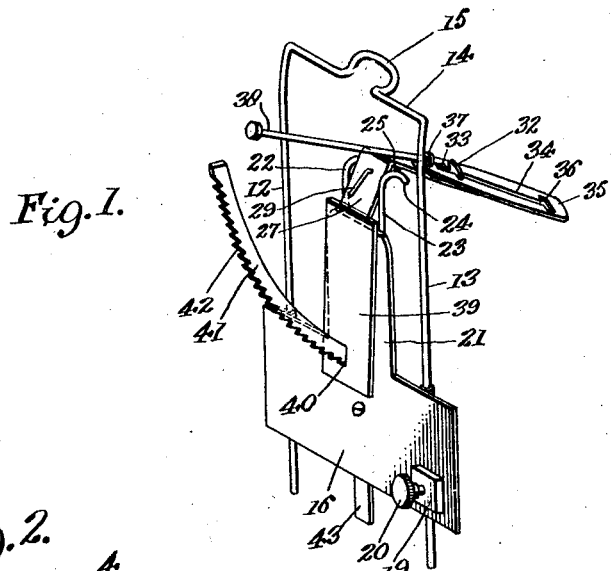
Figure 2:
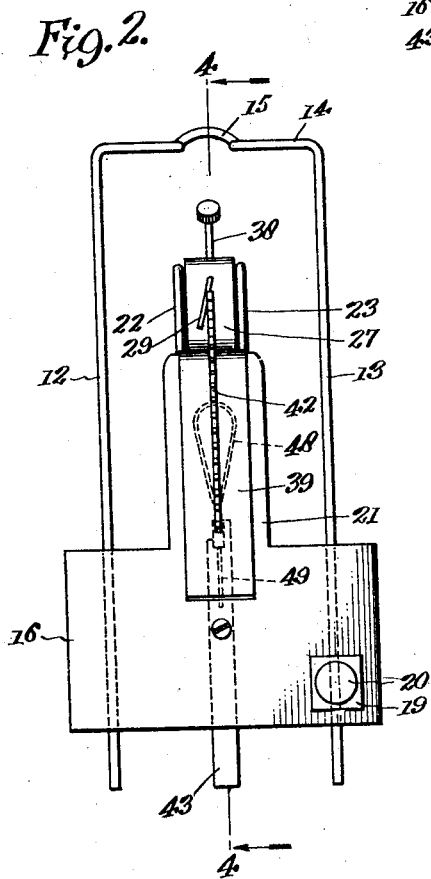
Figure 2 is a front elevation of the same.

Referring more particularly to that form of the invention, shown in Figures 1 to 4 inclusive, 12 and 13 designate spaced parallel legs and 14 designates an upper cross bar connecting the legs and having a loop 15 formed therein for engagement by the upper jaw. Upon the under side of the plate 16 are two sleeves 17 and 18 through which the legs 12 and 13 are slidably placed. Threaded into the plate 16 and also, if desirable, through a block 19 carried by the plate 16 is a set screw, for screwing down on the leg 13 to hold them, 12 and 13, in adjusted position on the plate 16. Slidably mounted upon the legs 12 and 13 is a plate 16, this plate being shown in Figure 3 as having the sleeves 17 and 18 for enveloping the legs 12 and 13. Threaded into the plate 16 and also, if desirable, through a block 19 carried by the plate is a set screw 20 for taking into one of the legs 13 for the purpose of holding the plate 16 in adjusted position.

Figure 3:
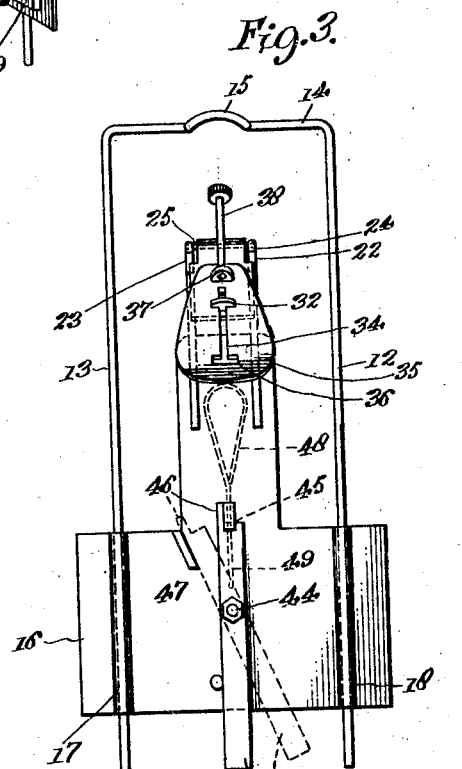
Figure 3 is a rear elevation of the device.

Centrally a narrowed part 21 of the plate extends upward and is completed by attachment at the upper end of 21, of two terminals, curved to be placed over the lower teeth, or jaw, and at the highest part of their curved termination is a cross bar 25, Figure 1. The spaced rods 22 and 23 having the rearwardly and downwardly curved upper ends 24, which are disposed beneath the loop or upper jaw holder 15. The curved jaw holding parts 24 are connected by a rod 25 engaged by the open hook 26 carried upon the intermediate portion 27 of a lever rotatable about the pivot or fulcrum connecting rod 25. The lever is provided with a loose pin 28 slidable therethrough and having a handle 29 bent at right angles from the pin 28 and overlying the upper portion of the lever. The lever also has a locking end 30 below the lever and also extending at substantially right angles to the axis of the pin 28. By gravity the pin and its associated parts seek the position shown in Figure 4, thus closing the open portion of the hook 26 and locking the lever upon the fulcrum 25. The loose pin that is shown as 28, 29, and 30 is to prevent the lever 39 slipping off the connecting and pivot rod 25 during an operation. The pin 28, 29 and 30 may be replaced by any other device that will effect the same purpose. The hold will be put in every instrument made, for the pin, but it will not be used when 48 is. This lever is also provided with a tongue holding portion 31 having a T-headed lug 32 extending upwardly therefrom in advance of a plain lug 33. In manufacturing these two, 32 and 31 may be made into one. Both these lugs are arranged to be received in a longitudinal slot 34 in the tongue depressor or blade 35. This slot 34 is best seen in Figure 3, the outer end of the slot being T-shaped, as indicated at 36, to permit of the engagement and disengagement of the blade or depressor with the T-headed lug 32 which locks the blade or depressor in place, except when the wider portion 36 of the slot is in alinement therewith. The second lug 33 cooperates with the T-headed lug 32 to avoid lateral movement of the tongue depressor. The outer portion of the tongue depressor carries a threaded ear 37 for receiving the screw threaded portion of the rod 38, which is adapted to engage against the angle portion of the lever and bind the tongue depressor in place, and is removed, by unscrewing it, before beginning an operation. The parts are preferably made from metal, so that advantage may be taken of the inherent resiliency of this material to bind the parts against movement.

The lever also comprises the locking handle portion 39 of sheet metal having the opening 40 to engage about the curved rack bar 41 having the inclined teeth 42 to engage the lower edge of the opening 40.

As shown in Figure 3, a locking bar 43 is shown as fulcrumed at 44 upon the reverse side of the plate 16. The upper edge of this locking bar 43 is adapted to enter a slot 43 made in that portion of the rack bar 41 which projects to the rear side of the standard or fulcrum member 21, whereby such rack bar may be locked in place. The bar 43 carries at one side an upwardly projecting stop lug 46 for engaging the side of the rack bar to prevent further rotary movement of the bar 43. A cooperating stop 47 is carried by the rear side of the plate 16. The wire loop 48 having a single prong 49 inserted through the rack bar 41 is adapted to engage in front of the standard 21 to restrict the forward movement of the top end of 41, Figure 4 and 54, Figure 7 that will prevent the disengagement of the open hook 26 from around the pivot rod 25 during an operation. When 48 is used it is not necessary, nor intended to use the little device 29 and 30, Figure 4. When 29 and 30 is used that dispenses with 48, Figure 5. 48 also holds 41 and 54 steady in all directions.

In operation, the patient is anæsthetized, 43 is shoved to the side that liberates 41. 39 is then pulled up at the bottom bringing 41 with it. 29 is then arranged so the open hook at the top of 39 can be removed. The legs 12 and 13 are brought down so 15 rests on 22 and 23. The instrument is then placed in the patient's mouth so that 22 and 23 will hook over the patient's lower teeth and, 15 will be under the upper teeth. 12 and 13 are then shoved up until the mouth is well opened and both 12 and 13 are made fast by screwing down 20. The operator takes 39 and all the parts that make is complete; 35 is placed on 31. The open hook is placed on the cross bar at top of 22 and 23 and the bottom is shoved down against 16 and 21, Figure 4, and the lower end of 41 is shoved through the hold 40 and made fast by bringing back 43 to its place to hold, by slipping in a slot in the bottom end of 41. The operator then arranges 35 as far down on the patient's tongue as he wants it, by means of the handle 38. Then he pulls up 39 as far as necessary to properly depress the tongue for his needs in operating. He can then, if 35 is not as he wants it, release and rearrange it. When everything is as he wants it, 38 is unscrewed and removed from the mouth, out of the way. The tongue or blade is depressed by grasping the handle 39 of the lever and swinging it away from the standard or fulcrum member 21. The handle will engage in the inclined teeth 42 and retain the tongue depressor in place until positively forced back in the opposite direction.

The parts admit of quick assembly and separation, the entire tongue depressor being removable from the gag by simply lifting the pin 28 through the handle 29; and the rack bar 41 being removable by swinging the locking bar 43 to the dotted line position, shown in Figure 3. The plate 16 and units carried thereby may be disassociated from the upper jaw member by loosening the set screw 20.

Referring now more particularly to Figures 5, 6, and 7, the previous construction prevails in most respects and the same reference characters have been retained to indicate similar parts. Besides the set screw 20, the plate 16 is provided with a locking lever 50 pivoted at 51 upon the rear side of the plate 16 outwardly of the sleeve 18 against which engages the bow spring 52 carried by the handle of the lever 50. Such coil spring operates to urge the claw 53 of the lever leg 12 and to hold into notches on the leg 12 the plate in place. The set screw 20 may or may not be used with this locking lever.

A second point of departure resides in the substitution of the curved rod 54 for the rack bar, although this curved rod is held in place in a similar manner. The curved rod is engaged by the handle 39 of the lever which is preferably provided with a perforated block 55 carrying a set screw 56 to take against the rod 54 for the purpose of holding the tongue depressor in adjusted position. The engagement of the lever with the curved rod 54 will dispense with the necessity for having the locking pin 28.

Figure 8:
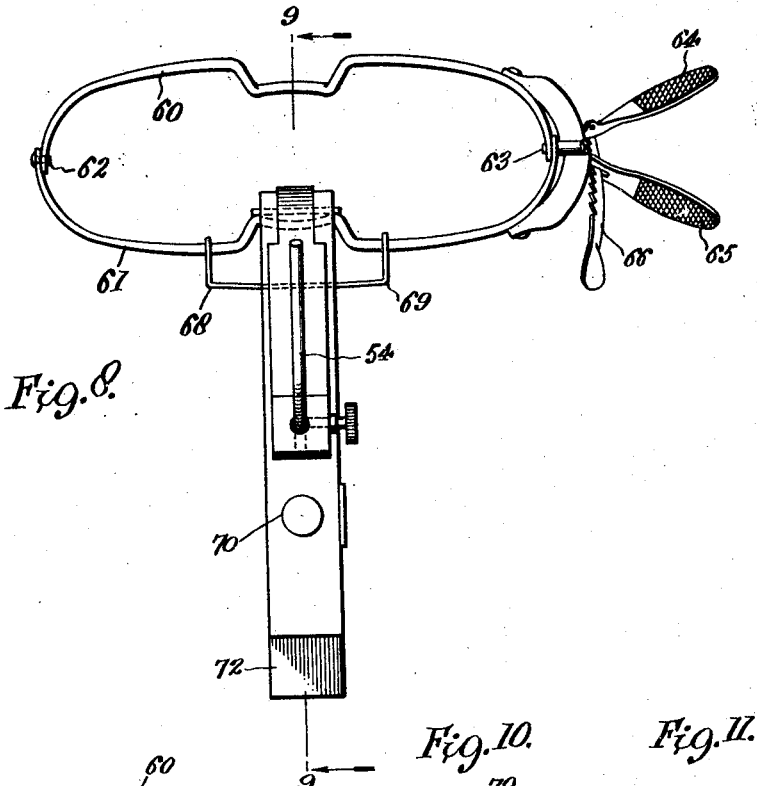
Figure 8 is a front elevation of a further modified form of device.
Figure 9:
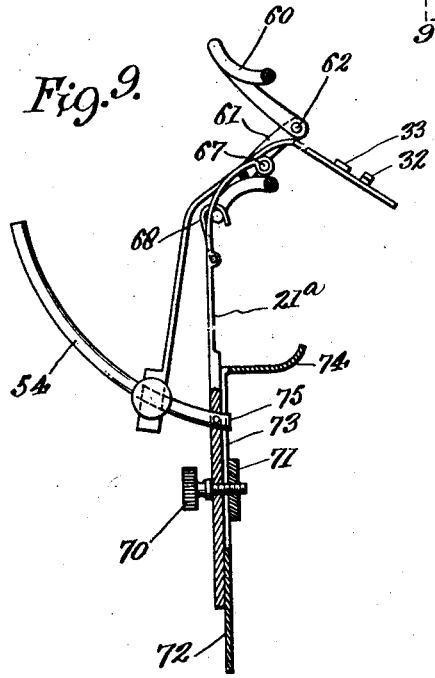
Figure 9 is a vertical section taken on the line 9—9 in Figure 8.

Figures 8 and 9 show the application of the invention to the Whitehead mouth gag or any other similarly constructed mouth gag consisting of the jaws 60 and 61 pivoted as indicated at 62 and 63 and operable by the handles 64 and 65 with which are associated a rack holding bar 66.

In this instance the standard or fulcrum member 21ª carries the tongue depressing lever, which is pivoted as indicated at 67 thereon. Looped hangers 68 and 69 are secured to the standard or fulcrum member 21ª and engage about the portions of the lower jaw 61 to opposite sides of the center thereof. The lower portion of the standard or fulcrum member 21ª is unprovided with any plate, such as the plate 16, as shown in Figure 9, and receives the set screw 70, which is also threaded into the nut 71 engaging against the rear face of the adjustable clip strip 72 having a slot 73 to straddle the shank of the set screw 70 to permit of the vertical adjustment of the strip 72, which carries the chin rest 74. This clip is prevented from swinging from side to side by the engagement of the side walls of the slot 73 with the projecting end 75 of the curved rod 54, which provides a guide and lock for the tongue depressor.

Figure 10:
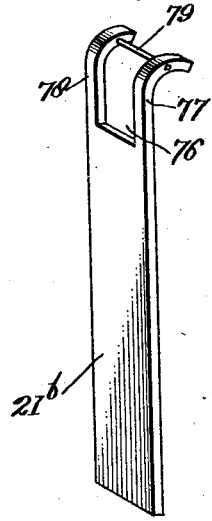
Figure 10 is a perspective view of the standard or plate.

Referring to Figure 10 a further modified form of standard or fulcrum member is shown at 21ᵇ having the slot 76 in its upper end providing the forks 77 and 78 curved at their upper portions to conform to the lower jaw and connected by the fulcrum pin 79 upon which the tongue blade holder is pivotally mounted. The shank of the member 21ᵇ is preferably of uniform width and thickness.

Figure 11:
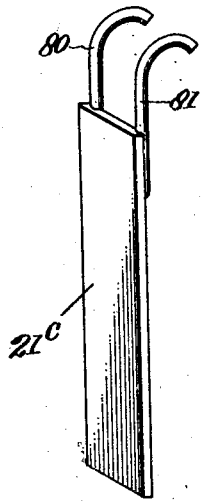
Figure 11 is a similar view of a modified form of standard or plate.

In Figure 11 a further modified form of fulcrum member 21ᶜ is shown as being composed of a plate or bar of metal or other appropriate material having the rods 80 and 81 manufactured separately and secured thereto as by soldering, brazing, welding or the like. These rods are curved at their upper ends as a jaw holder but are unconnected.

Figure 11 is a similar view of a modified form of a standard or fulcrum member, that may be equipped with a cross bar as in Figure 10, or both may have a hook on top of each top piece, that is intended to hook over the bottom teeth and when the chin fastening 74, Figure 9 is shoved up against the chin and fastened, the attachment is made secure without the hooks 68 and 69, Figure 8. Instead of a cross bar as shown in Figure 10 both the top pieces that hook over the bottom teeth or jaw may have a hook that the open end is out or in from the top ends of 77 and 78, Figure 10, and 80 and 81, Figure 11, under which a pivot, fastened any way, through or on top of 27, Figure 4. This for the purpose of using it as an attachment to the Whitehead, or any similarly constructed mouth gag, when the innermost horizontal part of 61, Figure 8 has been cut out, or it may be ground off on its upper and inner part, until it will not be in the way of being struck by 31 when 39, Figure 7, is pulled up so as to hold down the tongue. If cut out, the two pieces of 61 may be held together by a piece of steel wire fastened by any means of soldering, welding or brazing to the lower side of inner ends 61 or an E-shaped piece of steel wire may be by any means fastened to the lower side of 61 where it begins to bend in, thus holding the cut 61 as a solid piece, and entirely dispense with 68 and 69, or 68 and 69 can be used, as by use, it shows which way is best.

The most specific claim in this application for a patent is in the fulcrum 16 and 21, Figure 1, on which a complete instrument is constructed and 21ᵇ and 21ᶜ, Figures 10 and 11, on which an attachment to the Whitehead mouth gag or any other similarly constructed mouth gag is built, or constructed.

Application is made that anyone using in any way either one of these fulcrums infringes upon the rights of the owner of the patent granted under this application for a patent. And a very positive application is made that the above two provisions regarding the fulcrums be plainly stated in the patent applied for.

It is obvious that various changes and modifications may be made in the details of construction and design of the above specifically described embodiment of this invention without departing from the spirit thereof, such changes and modifications being restricted only by the scope of the following claims.

What is claimed is:—

1. An instrument of the kind described comprising a frame having a jaw holding means, a plate adjustably carried by said frame, a standard on said plate having jaw engaging means, a tongue depressing lever carried by said standard, a curved rack bar fitted through said standard and having a notched portion, a pivoted locking bar on the plate for engaging in the notch of said rack bar, and a looped member having a terminal engaging with said rack bar on the opposite side of the standard.

2. A tongue depressor comprising a depressing lever, a frame on which the lever is mounted, a curved rack bar fitted through said frame and having a notched portion, and a movable locking element on said frame for engaging the notch of said bar.

3. A tongue depressor comprising a depressing lever, a frame on which the lever is mounted, a curved rack bar fitted through said frame and having a notched portion, a movable locking element on said frame for engaging the notch of said bar, and a restraining member engaging with the rack bar at the opposite side of the frame from said locking element.

BENJAMIN FRANKLIN BELL, Sr., M. D.